(12) United States Patent
Yuan

(10) Patent No.: US 11,753,182 B2
(45) Date of Patent: Sep. 12, 2023

(54) PAN-TILT STRUCTURE FOR CAMERA OF UNMMANNED AERIAL VEHICLE

(71) Applicant: Xingping Yuan, Dongguan (CN)

(72) Inventor: Xingping Yuan, Dongguan (CN)

(73) Assignee: Xingping Yuan, Dongguan (CN)

( * ) Notice: Subject to any disclaimer, the term of this patent is extended or adjusted under 35 U.S.C. 154(b) by 577 days.

(21) Appl. No.: 17/067,647

(22) Filed: Oct. 10, 2020

(65) Prior Publication Data
US 2021/0031943 A1    Feb. 4, 2021

(30) Foreign Application Priority Data

Sep. 23, 2020  (CN) .......................... 202011009534.2

(51) Int. Cl.
| | |
|---|---|
| *B64D 47/08* | (2006.01) |
| *F16M 11/18* | (2006.01) |
| *G03B 17/56* | (2021.01) |
| *B64C 39/02* | (2023.01) |
| *F16M 11/12* | (2006.01) |
| *B64U 101/30* | (2023.01) |

(52) U.S. Cl.
CPC ............ *B64D 47/08* (2013.01); *B64C 39/024* (2013.01); *F16M 11/126* (2013.01); *F16M 11/18* (2013.01); *G03B 17/561* (2013.01); *B64U 2101/30* (2023.01)

(58) Field of Classification Search
CPC ......... G03B 17/561; F16M 11/12–128; H04N 23/695; B64D 47/08; B64U 20/87
USPC .......................................................... 396/428
See application file for complete search history.

(56) References Cited

U.S. PATENT DOCUMENTS

| | | | | |
|---|---|---|---|---|
| 3,689,695 A | * | 9/1972 | Rosenfield ............. | F16M 13/02 |
| | | | | 348/148 |
| 4,655,567 A | * | 4/1987 | Morley .................. | F16M 11/18 |
| | | | | 396/419 |
| 9,086,123 B2 | * | 7/2015 | Vezain .................... | F16H 19/08 |
| 10,574,127 B2 | * | 2/2020 | Takizawa ............. | H02K 11/215 |

(Continued)

FOREIGN PATENT DOCUMENTS

CN         210175146 U  *  3/2020

OTHER PUBLICATIONS

Preliminary Report On Patentability for PCT/CN2020/119221—dated Mar. 28, 2023 (Year: 2023).*

*Primary Examiner* — Leon W Rhodes, Jr.
(74) *Attorney, Agent, or Firm* — Nitin Kaushik

(57) ABSTRACT

The present disclosure provides a novel pan-tilt structure for a camera of an UAV, comprising: a camera chip mounting seat, a steering mechanism, a housing, an output shaft, and a motor component, a PCBA circuit board, a speed reduction device and a position detection assembly which are all mounted in the housing; the steering mechanism is rotatably mounted on a steering mechanism mounting seat; the output shaft is located above the housing extending with a push rod; the steering mechanism connected to the push rod of the output shaft; the camera chip mounting seat is mounted at an end of the steering mechanism away from the steering mechanism mounting seat. The present disclosure realizes the miniaturization of a servo, the pan-tilt provided by the present disclosure is higher in rotation stability, more diversified in rotation angle, smaller in size, easy to mount and low in cost, and shoots clear pictures.

9 Claims, 3 Drawing Sheets

(56) References Cited

U.S. PATENT DOCUMENTS 10,655,776 B2 * 5/2020 Huang ................. H02K 11/215
2021/0080810 A1 * 3/2021 Song ..................... F16M 11/18

* cited by examiner

PAN-TILT STRUCTURE FOR CAMERA OF UNMMANNED AERIAL VEHICLE

TECHNICAL FIELD

The present disclosure relates to the technical field of unmanned aerial vehicle (UAV) pan-tilts, and in particular to a novel pan-tilt structure for a camera of an UAV.

BACKGROUND

A conventional servo mainly includes a housing, a circuit board, a driving motor, a speed reduction gear and a position detection element. The operation principle of the conventional servo is as follows: a receiver sends a signal to the servo, the coreless motor is driven to rotate by the IC on the circuit board, power is transferred to the output shaft through the speed reduction gear, and a signal is returned to the position detector on the output shaft to determine whether it has been positioned. The position detector is actually a variable resistor or a rotary magnetic encoder. During the rotation of the servo, the voltage value will also change, so that the angle of rotation can be obtained according to the detected voltage value.

At present, the servos popular in the market are in various shapes and of various types. However, the main functional modules in the servos are basically the same. The main components and functions of the servos are as follows: the servo controller is an actuator of the whole control system; there are a central controller, a data memory, a driving module and the like in the servo controller; and, the mainboard of the central controller is a single-chip microcomputer which allows manual writing of language programs to realize directional control.

To improve the stability and definition of images shot by UAV pan-tilts in flight, many UAV products use DC servos for pan-tilts so that the images shot by the UAVs are stable and clear. However, among some existing DC servo pan-tilts, the servos of some pan-tilts are large in size and difficult to mount and position, and the pan-tilts are complex in structure, low in performance and high in cost, so that the servo pan-tilts have certain limitations when in use, and the images shot have jitters and are unclear.

As one of the important components for the aerial photography of the UAVs, the servo pan-tilts are used to mount and fix a camera and control the rotation and shooting angle of the camera, to realize the balancing and stabilizing functions. There are various forms of pan-tilts in the current market. The prior technology has the following technical defects.

1. The pan-tilts in the current market are three-axis pan-tilts, which are high in price, complex in structure and large in size and are made of metal material. Such pan-tilts weigh more than 500 grams together with the lens, and are always troubled by jitters, high failure rate and shortened overall battery life.

2. In the servo pan-tilts in the market, one or two servos are used or a gear is mounted on an output shaft outside the gear box; the gear on the shaft is meshed with a second gear to drive upper and lower housings of the camera; and the camera chip assembly is large in size, complex in structure and extremely low in mounting and positioning accuracy.

SUMMARY

The present disclosure provides a novel pan-tilt structure for a camera of an unmanned aerial vehicle (UAV), which, by making technical transformations to the existing devices, solves the problems of poor mounting and positioning effects of motors of existing servo pan-tilts for UAVs and the problem that the stability and angle adjustment mode of the shooting pan-tilts need to be improved.

To solve the above technical problem, the present disclosure specifically employs the following technical solution.

A novel pan-tilt structure for a camera of an UAV is provided, including: a camera chip mounting seat, a steering mechanism, a housing, an output shaft, and a motor component, a PCBA circuit board, a speed reduction device and a position detection assembly which are all mounted in the housing, wherein the motor component and the position detection assembly are electrically connected to the PCBA circuit board, respectively, and the speed reduction device is in driving connection to the motor component;

a steering mechanism mounting seat is arranged above the housing; the steering mechanism is rotatably mounted on the steering mechanism mounting seat; the output shaft is provided with a push rod extending above the housing; the steering mechanism is in driving connection to an end of the push rod of the output shaft; and, the camera chip mounting seat is mounted at an end of the steering mechanism away from the steering mechanism mounting seat and is used for mounting a camera chip;

a positioning column hole for accommodating the motor component is formed in the housing, the motor component is directly mounted in the positioning column hole of the housing, and a motor brush piece is directly machined on the PCBA circuit board;

the speed reduction device includes a speed reduction gear set which is in driving connection to a rotating shaft of the motor component, an output shaft gear is sleeved around the output shaft, internal threads are arranged in the output shaft gear to be in threaded connection to the output shaft, and the output shaft is meshed with a gear of the speed reduction gear set through the output shaft gear; and the position detection assembly includes the output shaft gear, a magnet and a Hall element; the Hall element is directly machined on the PCBA circuit board; a magnet mounting hole is formed at a lower end of the output shaft; the magnet is mounted in the magnet mounting hole; and, when the output shaft gear drives the output shaft to move up or down, the magnet is allowed to move in a linear direction above the Hall element to realize position detection.

Preferably, the steering mechanism includes first torsion springs, a first steering shaft, a first steering member, a first steering member mounting seat, second torsion springs, a second steering shaft and a second steering member; the first steering member is fixedly arranged below the camera chip mounting seat, and the first steering member is rotatably mounted on the first steering shaft; the first steering member mounting seat is fixedly arranged at an upper end of the second steering member; the first steering shaft is fixedly connected to the first steering member mounting seat; a first steering member positioning column is arranged between the first steering member mounting seats at the upper end of the second steering member; a first steering member groove is formed at a lower end of the first steering member; the first positioning column is located between two sidewalls of the first steering member groove to prevent axial play of the first steering member along the first steering shaft; the first torsion springs are further sleeved outside the first steering shaft and are resisted against the second steering member and the first steering member, respectively; the second steering member is rotatably mounted on the second steering shaft, and the second steering shaft is fixedly mounted on the steering mechanism mounting seat; the second torsion springs are further sleeved outside the second steering shaft and are resisted against the housing and the second steering member, respectively; the first steering member and the second steering member are always closely attached to the push rod of the output shaft; a second steering member groove is formed at a lower end of the second steering member; a housing positioning column is further arranged between the steering mechanism mounting seats; and, the housing positioning column is located between two sidewalls of the second steering member groove to prevent axial play of the second steering member along the second steering shaft.

Preferably, there are two first torsion springs and two second torsion springs; the two first torsion springs are mounted at left and right ends of the first steering member in reverse orientations; and, the two second torsion springs are mounted at left and right ends of the second steering member in reverse orientations.

Preferably, the push rod includes a first push rod and a second push rod; a direction of rotation of the first steering member about the first steering shaft is perpendicular to a direction of rotation of the second steering member about the second steering shaft; a first push surface is extended outward from the first steering member, and the first push rod is closely attached to the first push surface; and, a second push surface is extended outward from the second steering member, and the second push rod is closely attached to the second push surface.

Preferably, a contact surface of the first push surface with the first push rod and a contact surface of the second push surface with the second push rod are both curved surfaces.

Preferably, a signal and power connector is further arranged on a side of the PCBA circuit board.

Preferably, the housing includes an upper cover, a middle cover and a lower cover successively from the top down; the PCBA circuit board is fixed in the lower cover; the motor component and the position detection assembly are arranged in the middle cover; the speed reduction device and the output shaft are arranged in the upper cover; and, the upper cover, the middle cover and the lower cover are screwed and fixed by a stud sequentially passing through the lower cover, the middle cover and the upper cover.

Preferably, a current overload protection function is provided in the PCBA circuit board by a software system, to realize automatic power-off in case of a current overload.

Preferably, a learning and repositioning function is provided in the PCBA circuit board by a software system, to enable learning of multiple times of positioning and storage of data for a next positioning.

Compared with the prior art, the present disclosure has the following beneficial effects.

In the present disclosure, a servo is miniaturized by improving the assembling of the motor and innovatively designing the Hall element, the magnet or the like. In the present disclosure, since a variable reluctance for detection is formed by moving the magnet in a linear direction above Hall element, compared with the conventional variable reluctances, the variable reluctance of the present disclosure has a longer service life, is lower in cost, and is easier to machine. The motor component is directly assembled on the housing, so the cost and space are saved, and the difficulty in mounting and positioning a miniature motor is mainly solved. The motor brush piece and the Hall element are directly machined on the PCBA circuit board, so that the problem on the difficulty and cost control of the conventional machining technology is solved. In addition, by additionally providing a current overload protection function in the software system, the gears, the motor component and the PCBA circuit board are protected from damage due to an overload. Furthermore, by additionally providing a learning and repositioning function in the software system, it is more intelligent. In the present disclosure, a lens rotating frame is always kept closely attached to the push rod by the two sets of torsion springs always keep, so the rotation stability of the pan-tilt becomes better. Rotation about the spatial cross-axis camera is formed by converting the motion of the two-axis push rod about the seat into a rotation motion, so that the rotation angle is more diverse. The variable reluctance of the present disclosure can be positioned and controlled at 36 degrees without dead angle, while the conventional servos can only control certain angles.

The present disclosure solves the long-standing problems in small UAVs that high-end three-axis pan-tilts are expensive and heavy while low-end pan-tilts are large in size, difficult to mount and high in cost and obtain unclear pictures with jitters. The pan-tilt for a camera of an UAV provided by the present disclosure is small in size, easy to mount and low in cost, and the definition of shot pictures can reach the shooting effects of the three-axis pan-tilts.

in which:

1: camera chip mounting seat; 2: steering mechanism; 21: first torsion spring; 22: first steering shaft; 23: first steering member; 231: first push surface; 232: first steering member groove; 24: second torsion spring; 25: second steering shaft; 26: second steering member; 261: second push surface; 262: second steering member groove; 27: first steering member mounting seat; 271: first steering member positioning column; 3: housing; 31: upper cover; 32: middle cover; 33: lower cover; 4: output shaft; 41: push rod; 411: first push rod; 412: second push rod; 5: motor component; 6: PCBA circuit board; 61: signal and power connector; 7: speed reduction device; 71: speed reduction gear set; 8: position detection assembly; 81: output shaft gear; 82: magnet; 83: Hall element; 9: steering mechanism mounting seat; and, 91: housing positioning column.

DETAILED DESCRIPTION

The specific content of the present disclosure will be described below in detail by embodiments with reference to the accompanying drawings.

Figure 1:
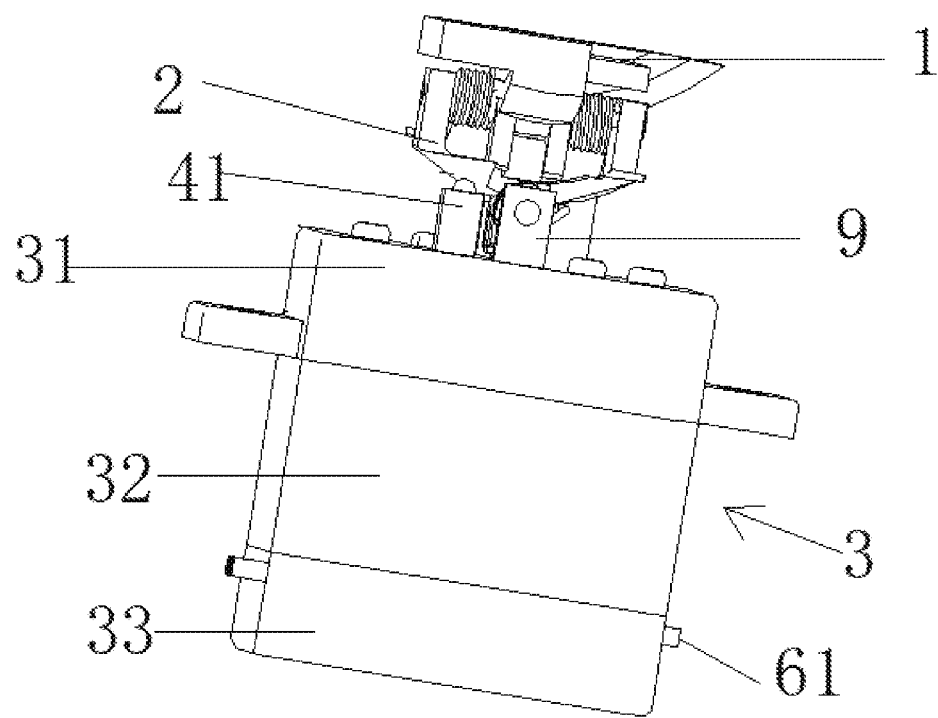
FIG. 1 is a schematic structural diagram of the present disclosure.
Figure 2:
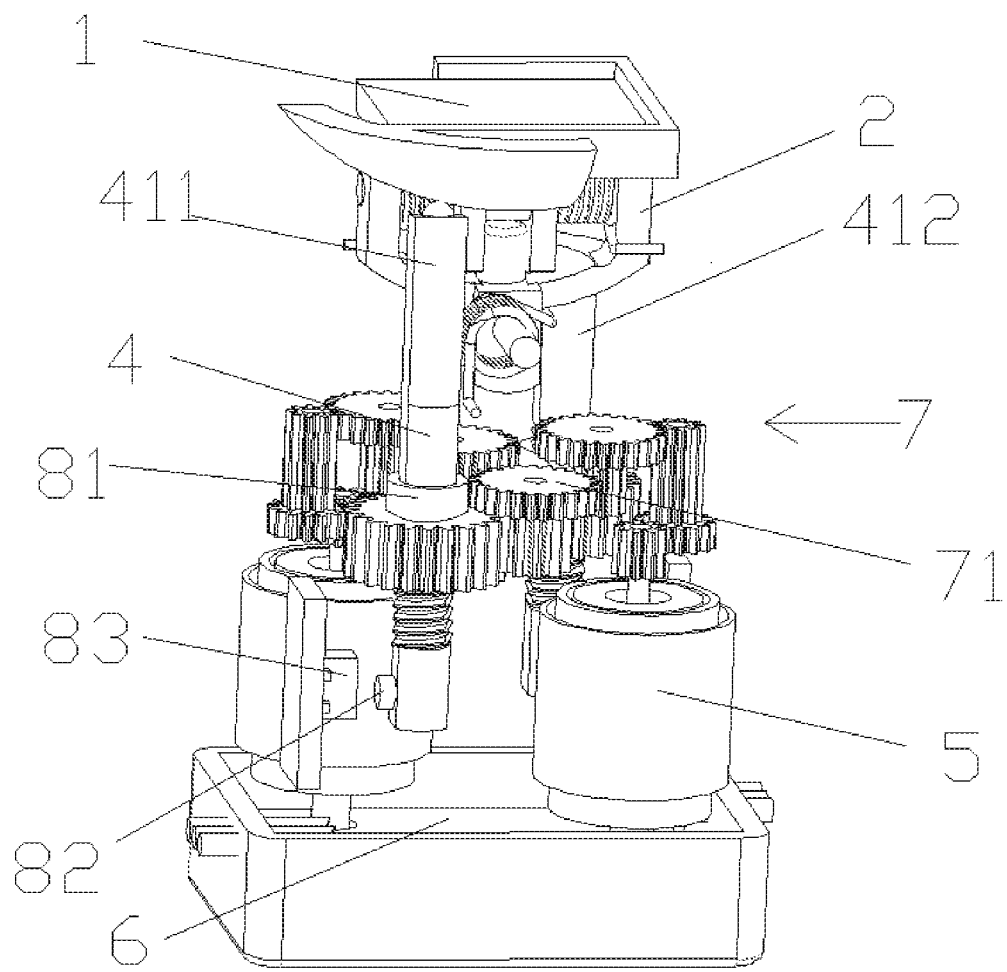
FIG. 2 is an installation diagram of a motor component, a PCBA circuit board and a speed reduction device according to the present disclosure.
Figure 3:
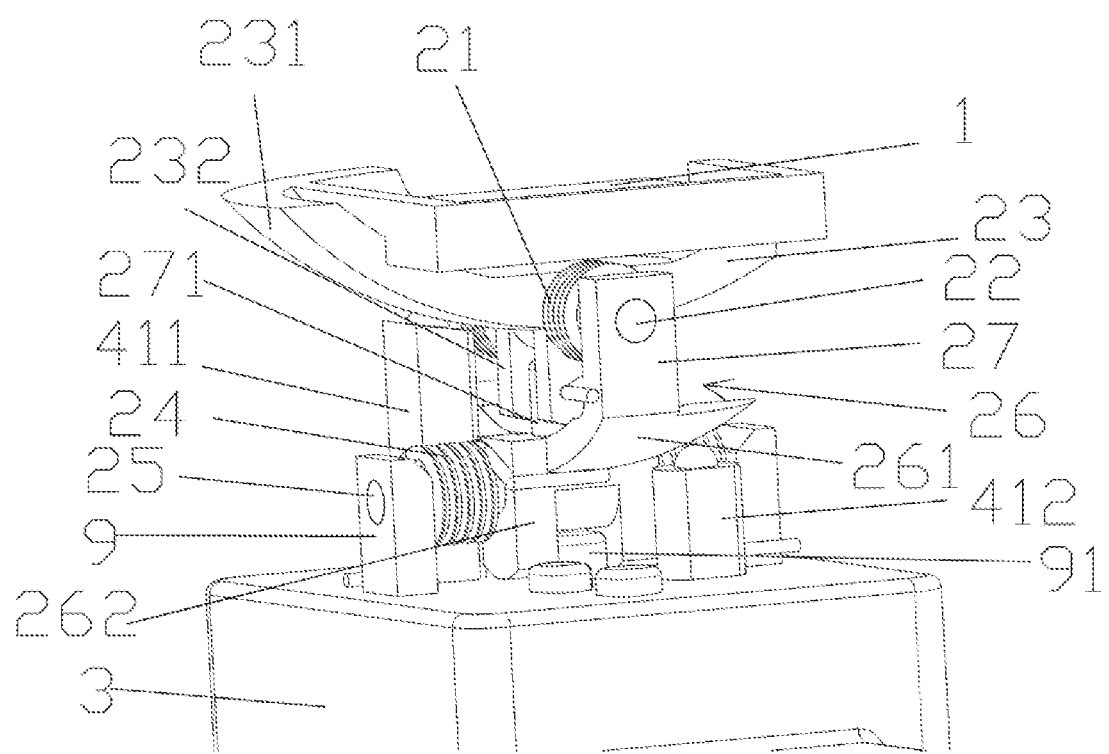
FIG. 3 is a schematic structural diagram of the pan-tilt in the process of mounting a two-axis push rod according to the present disclosure.

As shown in FIGS. 1-3, this embodiment provides a novel pan-tilt structure for a camera of an unmanned aerial vehicle (UAV), including: a camera chip mounting seat 1, a steering mechanism 2, a housing 3, an output shaft 4, and a motor component 5, a PCBA circuit board 6, a speed reduction device 7 and a position detection assembly 8 which are all mounted in the housing 3. The motor component 5 and the position detection assembly 8 are electrically connected to the PCBA circuit board 6, respectively. The speed reduction device 7 is in driving connection to the motor component 5.

A steering mechanism mounting seat 9 is arranged above the housing 3. The steering mechanism 2 is rotatably mounted on the steering mechanism mounting seat 9. The output shaft 4 is located above the housing 3, and the output shaft 4 provided with a push rod 41 extending above the housing. The steering mechanism 2 is in driving connection to an end of the push rod 41 of the output shaft 4. The camera chip mounting seat 1 is mounted at an end of the steering mechanism 2 away from the steering mechanism mounting seat 9, and is used for mounting a camera chip.

A positioning column hole for accommodating the motor component 5 is formed in the housing 3, the motor component 5 is directly mounted in the positioning column hole of the housing 3, and a motor brush piece is directly machined on the PCBA circuit board 6.

The speed reduction device 7 includes a speed reduction gear set 71 which is in driving connection to a rotating shaft of the motor component 5. An output shaft gear 81 is sleeved around the output shaft 4, and internal threads are arranged in the output shaft gear 81 to be in threaded connection to the output shaft 4. The output shaft 4 is meshed with a gear of the speed reduction gear set 71 through the output shaft gear 81.

The position detection assembly 8 includes the output shaft gear 81, a magnet 82 and a Hall element 83. The Hall element 83 is directly machined on the PCBA circuit board 6. A magnet 82 mounting hole is formed at a lower end of the output shaft 4, and the magnet 82 is mounted in the magnet 82 mounting hole. When the output shaft gear 81 drives the output shaft 4 to move up or down, the magnet 82 is allowed to move in a linear direction above the Hall element 83 to realize position detection.

Further, as shown in FIG. 3, to allow the two-axis push rod 41 to push the camera chip mounting seat 11 to rotate in different directions relative to the housing 33, the steering mechanism 2 includes first torsion springs 21, a first steering shaft 22, a first steering member 23, a first steering member mounting seat 27, second torsion springs 24, a second steering shaft 25 and a second steering member 26. The first steering member 23 is fixedly arranged below the camera chip mounting seat 1, and the first steering member 23 is rotatably mounted on the first steering shaft 22. The first steering member mounting seat 27 is fixedly arranged at an upper end of the second steering member 26. The first steering shaft 22 is fixedly connected to the first steering member mounting seat 27. A first steering member positioning column 271 is arranged between the first steering member mounting seats 27 at the upper end of the second steering member 26. A first steering member groove 232 is formed at a lower end of the first steering member 23, and the first positioning column is located between two sidewalls of the first steering member groove 232 to prevent the axial play of the first steering member 23 along the first steering shaft 22. The first torsion springs 21 are further sleeved outside the first steering shaft 22, and are resisted against the second steering member 26 and the first steering member 23, respectively. The second steering member 26 is rotatably mounted on the second steering shaft 25, and the second steering shaft 25 is fixedly mounted on the steering mechanism mounting seat 9. The second torsion springs 24 are further sleeved outside the second steering shaft 25, and are resisted against the housing 3 and the second steering member 26, respectively. The first steering member 23 and the second steering member 26 are always closely attached to the push rod 41 of the output shaft 4. A second steering member groove 262 is formed at a lower end of the second steering member 26. A housing positioning column 91 is further arranged between the steering mechanism mounting seats 9, and the housing positioning column 91 is located between two sidewalls of the second steering member groove 262 to prevent axial play of the second steering member 26 along the second steering shaft 25.

Further, to achieve better stability, there are two first torsion springs 21 and two second torsion springs 24; the two first torsion springs 21 are mounted at left and right ends of the first steering member 23 in reverse orientations; and, the two second torsion springs 24 are mounted at left and right ends of the second steering member 26 in reverse orientations.

Further, to allow the two-axis push rod 41 to push the camera chip mounting seat 1 to rotate about the spatial cross-axis relative to the housing 3, the push rod 41 includes a first push rod 411 and a second push rod 412. A direction of rotation of the first steering member 23 about the first steering shaft 22 is perpendicular to a direction of rotation of the second steering member 26 about the second steering shaft 25. A first push surface 231 is extended outward from the first steering member 23, and the first push rod 411 is closely attached to the first push surface 231. A second push surface 261 is extended outward from the second steering member 26, and the second push rod 412 is closely attached to the second push surface 261.

Further, to achieve the smoother and more stable rotation effect, a contact surface of the first push surface 231 with the first push rod 411 and a contact surface of the second push surface 261 with the second push rod 412 are both curved surfaces.

Further, a signal and power connector 61 is further provided on a side of the PCBA circuit board 6.

Further, the housing 3 includes an upper cover 31, a middle cover 32 and a lower cover 33 successively from the top down. The PCBA circuit board 6 is fixed in the lower cover 33, the motor component 5 and the position detection assembly 8 are arranged in the middle cover 32, and the speed reduction device 7 and the output shaft 4 are arranged in the upper cover 31. The upper cover 31, the middle cover 32 and the lower cover 33 are screwed and fixed by a stud sequentially passing through the lower cover 33, the middle cover 32 and the upper cover 31.

Further, a current overload protection function is provided in the PCBA circuit board 6 by a software system, to realize automatic power-off in case of a current overload; and, a learning and repositioning function is provided in the PCBA circuit board 6 by the software system, to enable learning of multiple times of positioning and storage of data for a next positioning.

The present disclosure has the following characteristics.

1. A variable reluctance is formed by allowing the push rod to do a linear motion in a threaded transmission manner and allowing the magnet to move in a linear direction above the Hall element.

2. The motor is directly assembled on the housing, so that the cost and space are saved, and the difficulty in mounting and positioning a miniature motor is mainly solved.

3. The motor brush piece and the Hall element are directly machined on the PCB circuit board, so that the difficulty and cost control of the conventional machining technology are solved.

4. By additionally providing a current overload protection function in the software, the gears, the motor component and the PCBA circuit board are protected from damage due to an overload.

5. A learning and repositioning function is additionally provided in the software.

6. The servo is miniaturized by improving the assembling of the motor and innovatively designing the Hall element, the magnet or the like.

7. A lens rotating frame is always kept closely attached to the push rod by the two sets of torsion springs, so the rotation stability of the pan-tilt becomes better.

8. Rotation about the spatial cross-axis camera is formed by converting the motion of the two-axis push rod about the seat into a rotation motion, so that the rotation angle is more diverse, and the practicability is higher.

The present disclosure solves the long-standing problems in UAVs that small high-end three-axis pan-tilts are expensive and heavy while low-end pan-tilts are large in size, difficult to mount and high in cost and obtain unclear pictures with jitters. The pan-tilt for a camera of an UAV provided by the present disclosure is small in size, easy to install and low in cost, and the definition of shot pictures can reach the shooting effects of the three-axis pan-tilts.

Finally, it is to be noted that the forgoing embodiments are merely for describing the technical solutions of the present disclosure, rather than limiting the present disclosure. Although the present disclosure has been described above in detail by the preferred embodiments, it should be understood by a person of ordinary skill in the art that modifications or equivalent replacements may be made to the technical solutions of the present disclosure without departing from the gist and scope of the technical solutions of the present disclosure, and these modifications or equivalent replacements shall fall into the scope defined by the appended claims of the present disclosure.

All the standard parts used in the present disclosure can be purchased from the market, and the special-shaped parts can be customized according to the records in the description and the accompanying drawings. The specific connection mode of each part adopts the conventional means such as bolts rivets or welding which are mature in the prior art. The machines, parts and devices are of the conventional models in the prior art. In addition, the circuit connection adopts the conventional connection mode in the prior art. It will not be repeated here.

In the description of the present application, unless otherwise expressly specified and defined, the terms "mount", "connect with", "connect to", "fix" and the like shall be interpreted in a broad sense, for example, it may be fixed connection, or may be detachable connection or integral formation; or, it may be mechanical connection or electrical connection; or, it may be direct connection, or connection via an intermediate medium; or, it may be internal communication of two elements or interaction between two elements. For a person of ordinary skill in the art, the specific meanings of the terms in the present disclosure can be interpreted according to specific situations.

The invention claimed is:

1. A novel pan-tilt structure for a camera of an unmanned aerial vehicle (UAV), comprising: a camera chip mounting seat, a steering mechanism, a housing, an output shaft, and a motor component, a PCBA circuit board, a speed reduction device and a position detection assembly which are all mounted in the housing, the motor component and the position detection assembly being electrically connected to the PCBA circuit board, respectively, the speed reduction device being in driving connection to the motor component, wherein:

a steering mechanism mounting seat is arranged above the housing; the steering mechanism is rotatably mounted on the steering mechanism mounting seat; the output shaft is located above the housing, and the output shaft is provided with a push rod extending above the housing; the steering mechanism is in driving connection to an end of the push rod of the output shaft; and, the camera chip mounting seat is mounted at an end of the steering mechanism away from the steering mechanism mounting seat, and is used for mounting a camera chip;

a positioning column hole for accommodating the motor component is formed in the housing, the motor component is directly mounted in the positioning column hole of the housing, and a motor brush piece is directly machined on the PCBA circuit board;

the speed reduction device comprises a speed reduction gear set which is in driving connection to a rotating shaft of the motor component, an output shaft gear is sleeved around the output shaft, internal threads are arranged in the output shaft gear to be in threaded connection to the output shaft, and the output shaft is meshed with a gear of the speed reduction gear set through the output shaft gear; and the position detection assembly comprises the output shaft gear, a magnet and a Hall element; the Hall element is directly machined on the PCBA circuit board; a magnet mounting hole is formed at a lower end of the output shaft; the magnet is mounted in the magnet mounting hole; and, when the output shaft gear drives the output shaft to move up or down, the magnet is allowed to move in a linear direction above the Hall element to realize position detection.

2. The novel pan-tilt structure for a camera of an UAV according to claim 1, wherein the steering mechanism comprises first torsion springs, a first steering shaft, a first steering member, a first steering member mounting seat, second torsion springs, a second steering shaft and a second steering member; the first steering member is fixedly arranged below the camera chip mounting seat, and the first steering member is rotatably mounted on the first steering shaft; the first steering member mounting seat is fixedly arranged at an upper end of the second steering member; the first steering shaft is fixedly connected to the first steering member mounting seat; a first steering member positioning column is arranged between the first steering member mounting seats at the upper end of the second steering member; a first steering member groove is formed at a lower end of the first steering member; the first positioning column is located between two sidewalls of the first steering member groove to prevent axial play of the first steering member along the first steering shaft; the first torsion springs are further sleeved outside the first steering shaft, and are resisted against the second steering member and the first steering member, respectively; the second steering member is rotatably mounted on the second steering shaft, and the second steering shaft is fixedly mounted on the steering mechanism mounting seat; the second torsion springs are further sleeved outside the second steering shaft, and are resisted against the housing and the second steering member, respectively; the first steering member and the second steering member are always closely attached to the push rod of the output shaft; a second steering member groove is formed at a lower end of the second steering member; a housing positioning column is further arranged between the steering mechanism mounting seats; and, the housing positioning column is located between two sidewalls of the second steering member groove to prevent axial play of the second steering member along the second steering shaft.

3. The novel pan-tilt structure for a camera of an UAV according to claim 2, wherein there are two first torsion springs and two second torsion springs; the two first torsion springs are mounted at left and right ends of the first steering member in reverse orientations; and, the two second torsion springs are mounted at left and right ends of the second steering member in reverse orientations.

4. The novel pan-tilt structure for a camera of an UAV according to claim 2, wherein the push rod comprises a first push rod and a second push rod; a direction of rotation of the first steering member about the first steering shaft is perpendicular to a direction of rotation of the second steering member about the second steering shaft; a first push surface is extended outward from the first steering member, and the first push rod is closely attached to the first push surface; and, a second push surface is extended outward from the second steering member, and the second push rod is closely attached to the second push surface.

5. The novel pan-tilt structure for a camera of an UAV according to claim 4, wherein a contact surface of the first push surface with the first push rod and a contact surface of the second push surface with the second push rod are both curved surfaces.

6. The novel pan-tilt structure for a camera of an UAV according to claim 1, wherein a signal and power connector is further arranged on a side of the PCBA circuit board.

7. The novel pan-tilt structure for a camera of an UAV according to claim 1, wherein the housing comprises an upper cover, a middle cover and a lower cover successively from the top down; the PCBA circuit board is fixed in the lower cover; the motor component and the position detection assembly are arranged in the middle cover; the speed reduction device and the output shaft are arranged in the upper cover; and, the upper cover, the middle cover and the lower cover are screwed and fixed by a stud sequentially passing through the lower cover, the middle cover and the upper cover.

8. The novel pan-tilt structure for a camera of an UAV according to claim 1, wherein a current overload protection function is provided in the PCBA circuit board by a software system, to realize automatic power-off in case of a current overload.

9. The novel pan-tilt structure for a camera of an UAV according to claim 1, wherein a learning and repositioning function is provided in the PCBA circuit board by a software system, to enable learning of multiple times of positioning and storage of data for a next positioning.

* * * * *